United States Patent Office 2,981,059
Patented Apr. 25, 1961

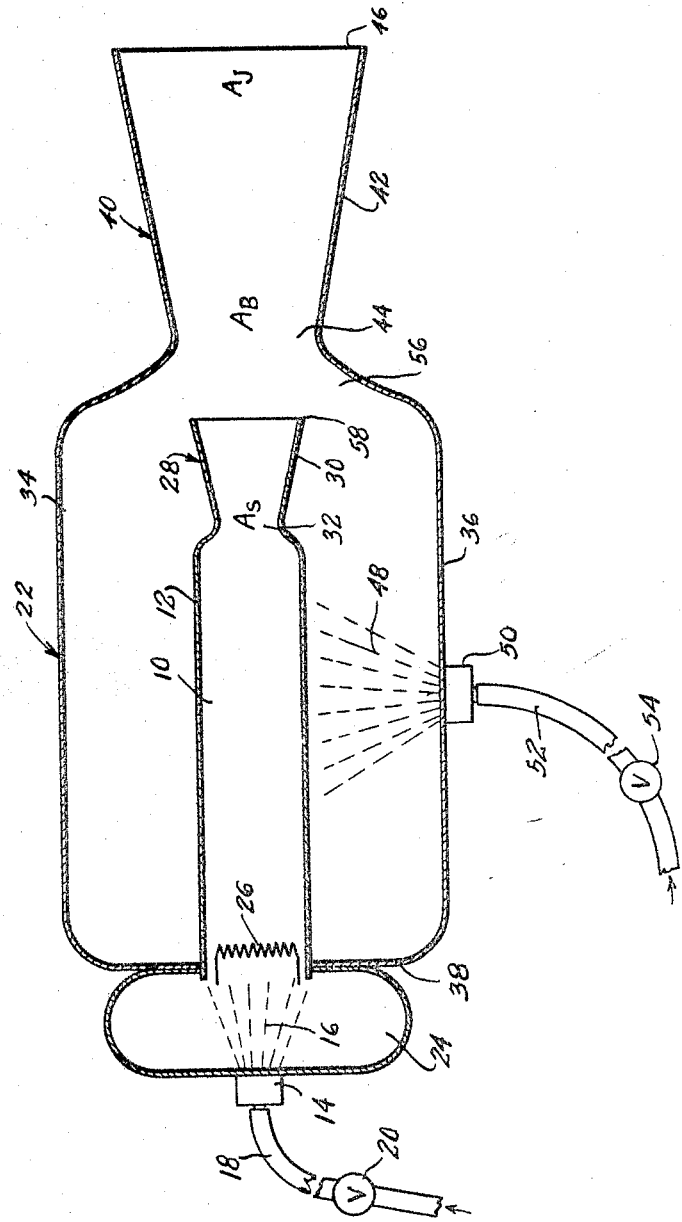

2,981,059
DUAL THRUST CHAMBER ROCKET

John W. Horner, Whittier, and Arthur J. Rothenberg, Culver City, Calif., assignors to Thompson Ramo Wooldridge Inc., a corporation of Ohio Filed Feb. 4, 1958, Ser. No. 713,240

3 Claims. (Cl. 60—35.6)

The present invention relates to improvements in jet propulsion systems, such as jet engines for aircraft or the like which obtain dual thrust levels for sustained flight and for accelerated flight.

In the propulsion of certain aircraft, a jet engine is required which will deliver dual thrust levels of power, one of which delivers a high thrust during the period when the aircraft is accelerated to high speed, and another level to sustain flight speed. An example of an aircraft having such a demand for an engine is a drone which is released from a launching aircraft, and which is accelerated to high speed following release after which a low thrust is applied to sustain flight speed. The two required thrust levels may differ by a substantial factor, and consequently, two separate thrust chambers are necessary or expedient for practical use. The provision of two thrust chambers creates disadvantages in aircraft flight in that extra space is required at the tail end of the aircraft where space is at a premium. Further, the weight of the dual thrust chambers is excessive. With the provision of dual chambers it is necessary to provide separate start and stop systems which necessitates the provision of extra equipment, increasing cost and the other inherent disadvantages of weight and additional equipment which can become inoperative. A serious disadvantage is encountered with the dual thrust system in that aircraft drag during the sustaining period is severely penalized by the high drag from the idle boost thrust chamber. This may reduce cruise speed up to thirty percent. The boost thrust chamber will often be of substantially larger size than the sustaining chamber, and the two thrust levels may differ by a factor as high as ten times.

While some of the above disadvantages are peculiar to aircraft, other disadvantages will accrue in the provision of a dual thrust system for any use wherein a dual thrust level performance is required of a jet engine.

Accordingly, it is an object of the present invention to provide an improved propulsion system which is capable of delivering dual thrust levels, and which avoids the disadvantages heretofore present.

Another object is to provide an improved dual thrust jet engine suitable for performance with aircraft or for other applications wherein a dual level of thrust is required.

Another object of the invention is to provide a dual level thrust engine having dual thrust chambers and eliminating the necessity for duplicating ignition systems.

A further object of the invention is to provide a dual thrust engine for use in aircraft wherein the drag of the engine is greatly reduced, and wherein the necessary drag at low thrust level is at a minimum.

A further object of the invention is to provide a dual thrust engine having a plurality of thrust chambers and nozzles wherein the chambers and nozzles operate cooperatively and contribute to the performance of each other, thereby improving the efficiency of the performance of the engine as a whole.

A still further object of the invention is to provide a dual thrust engine suitable for use for aircraft wherein the required space and the attendant weight are at a minimum.

Another object of the invention is to provide a dual level thrust engine employing two nozzles wherein each nozzle and its supplying combustion chamber may operate at maximum efficiency at each thrust level, and wherein a single nozzle accommodates the flow of both nozzles and is always flowing full during both boost and cruise period to eliminate the base drag of an idle nozzle.

Another object is to provide an improved dual thrust engine having no moving parts.

Other objects and advantages will become more apparent with the disclosure and teachings of the principles of the invention in connection with the description and showing of the preferred embodiment in the specification, claims and drawings, in which the single figure of the drawing illustrates a somewhat schematic showing in vertical sectional view of a dual thrust engine embodying the principles of the present invention.

As illustrated in the single figure of the drawing, a first combustion chamber 10 is provided for accommodating the combustion of a propellant fuel. The chamber is defined by an enclosing wall 12, which may be of substantially cylindrical and elongated shape.

Fuel is delivered to the combustion chamber from a nozzle assembly 14, which delivers a spray 16 of propellant fuel to the chamber. The nozzle 14 is supplied with fuel through a fuel line 18, and the flow of fuel therethrough may be controlled by a shut-off valve 20.

At the forward end of the engine 22, the combustion chamber 10 may be provided with an ignition chamber 24 to which the spray 16 of fuel is first delivered to engage an ignition device 26, which may take various forms, but which is shown for purposes of illustration only in the shape of an electrical resistance coil.

The combustion chamber 10 delivers a flow of burning propellant gases to a nozzle 28, connected to receive the gases from the chamber 10. The nozzle 28 has an outwardly diverging conically shaped wall 30 leading outwardly from a throat 32, which has an area $A_S$, as illustrated on the drawing.

The chamber 10 with its nozzle 28 will be utilized to deliver a continuous flow of gas throughout the operation of the engine. In aircraft utilization, this propulsion will be used as a sustaining propulsion for maintaining the speed of the aircraft after an acceleration period, and in addition to a boost thrust for boost periods.

Concentrically surrounding and outward of the sustaining chamber 10, is a boost thrust chamber 34 which accommodates the combustion of a burning fuel. The boost chamber 34 is preferably defined by an annular enclosing wall 36, which is turned in at its end 38 to meet the wall 12 of the sustaining chamber.

The burning propellant gases from the boost chamber 34 are delivered to a boost nozzle 40 which has a conically outwardly tapering wall 42 leading from the throat 44. The throat 44 has an area $A_B$ as illustrated on the drawing. The discharge end 46 of the nozzle 40 has a cross-sectional area $A_J$, as indicated on the drawing.

The wall 12 of the sustaining chamber 10 is formed of metal or a like material which will become hot with combustion within the chamber 10, and will radiate heat toward the surrounding boost chamber 34. Also, the wall 12 of the sustaining chamber will be sufficiently hot to ignite fuel sprayed into the chamber 34, such as illustrated at 48.

The fuel is sprayed into the boost chamber 34 by a nozzle member 50, which is supplied with fuel through a fuel line 52. The flow of fuel through the line is controlled by a shut-off valve 54, in order that the flow of may be terminated to operate the engine with the
[sus]taining chamber 10 alone.

[T]he nozzle 50 is preferably positioned so that the spray
[p]ropellant fuel 48 will be directed against the wall 12
[of t]he sustaining chamber for improved ignition. To
[start] the engine, combustion will be first started in the
[susta]ining chamber 10 until the wall 10 becomes suffi-
[cien]tly hot to cause ignition of the fuel, and then fuel
[will] be sprayed into the boost chamber, whereupon it
[will] automatically ignite.

[In] operation of the mechanism, such as for use on an
[aircr]aft requiring dual thrust levels, the engine is started
[by o]pening the valve 20 and heating the ignitor 26 to
[obtai]n ignition in the sustaining thrust chamber 10.
[Whe]n the wall 12 of the chamber becomes sufficiently
[hot,] the valve 54 is opened to spray fuel into the boost
[cham]ber to ignite the fuel therein. Fuel is then delivered
[to th]e chambers in optimum quantities to obtain the de-
[sired] thrust operation from the two nozzles 28 and 40.
[The] burning gases from the fuel in the outer boost thrust
[cham]ber 34 will flow through an annular space 56 be-
[twee]n the outer terminal edge 58 of the inner sustaining
[nozz]le, and the edge of the throat 44 of the boost nozzle
[40.] These burning gases will be commingled with the
[gase]s emitted through the sustaining nozzle 28, which will
[then] flow through the boost nozzle 40. At the end of the
[acce]leration or boost period, the valve 54 is closed to ex-
[ting]uish the combustion within the chamber 34, and com-
[bust]ion continues within the sustaining chamber 10. The
[burn]ing gases will continue to flow through the sustain-
[ing] thrust nozzle 28, and also flow out to fill the boost
[nozz]le 40. This continues through the sustaining thrust
[peri]od.

[As] an example of the employment of the engine, it
[may] be installed in an aircraft drone, which is launched
[from] another aircraft. Upon launching the drone, it will
[be] accelerated to high speed by operation of both the
[boo]st and thrust chambers, and when the desired oper-
[atin]g speed is achieved, the boost chamber may be turned
[off] whereupon the sustaining thrust chamber and noz-
[zle] continue operation with the gas flowing out through
[the] boost nozzle 40. It will be recognized that advan-
[tage]ous use of the engine is not limited to drones, and
[may] be used on missiles or aircraft. The invention may
[also] be used on other vehicles or in other applications
[othe]r than aircraft. Furthermore, the advantages of the
[inve]ntion are attainable with various propellants.

[T]hus, it will be seen that we have provided an im-
[pro]ved dual level thrust engine which meets the ob-
[ject]ives and attains the advantages hereinbefore set forth.
[The] engine obtains a unitary mechanism which provides
[two] thrust levels from a single chamber.

[A] single nozzle is utilized for final discharge of the
[gase]s, and the single nozzle is always flowing full dur-
[ing] both boost and cruise periods, thus eliminating the
[base] drag of an idle boost thrust chamber. It will be
[note]d that during the boost period, the engine performs
[as a] unit with a nozzle expansion ratio of $A_J/A_B$. At
[the] end of the boost period, the boost fuel is shut off.
[Wit]h only the sustaining chamber operating the nozzle
[area] ratio for sustaining operation is then $A_J/A_S$.

[T]he engine thus attains the performance of two thrust
[cha]mbers in a single package, which is small in size and
[ligh]t in weight. Further, only a single ignition system
[is n]eeded. Performance of the engine with its inherent
[adv]antages is obtained without necessarily providing mov-
[ing] parts.

[W]e have, in the drawings and specification, presented
[a de]tailed disclosure of the preferred embodiment of our
[inve]ntion, and it is to be understood that we do not in-
[tend] to limit the invention to the specific form disclosed,
[but] intend to cover all modifications, changes and alterna-
[tive] constructions and methods falling within the scope
[of t]he principles taught by our invention.

We claim as our invention:

1. A propulsion mechanism for jet propelled aircraft or the like wherein sustaining and boost levels of thrust are obtained for high altitude and low altitude flight comprising a thrust sustaining gas generating chamber, means for continuously delivering sustaining fuel to said sustaining chamber, a flight sustaining nozzle connected to said sustaining chamber, a boost gas generating chamber, means for delivering boost fuel to said boost chamber during boost periods of flight, and a boost nozzle connected to the boost chamber and positioned coaxial with the sustaining nozzle and with its throat spaced downstream from the end thereof forming an annular boost gas flow space at the end of the sustaining nozzle leading to the boost nozzle, the inner diverging surface of said boost nozzle sufficiently spaced axially from the sustaining nozzle to accommodate a flow of gas and forming a substantially parallel continuation of the inner diverging surface of the sustaining nozzle with substantially the same rate of expansion so that both nozzles will act as a single nozzle during sustaining flight and there is no base drag from an inoperative boost nozzle during the sustaining portion of flight with a high nozzle area ratio for high altitude sustaining flight and so that the boost nozzle alone will have a relatively low nozzle area ratio for boost gases for low altitude flight.

2. A propulsion mechanism for jet propelled aircraft or the like wherein sustaining and boost levels of thrust are obtained for high altitude and low altitude flight comprising in combination an inner thrust sustaining chamber having a heat conducting wall with a fuel igniting outer surface, an outer boost chamber coaxially surrounding said thrust sustaining chamber, a fuel injection means connected to the thrust sustaining chamber with means for continuously delivering flight sustaining fuel to the fuel injection means, a fuel injection means for the boost chamber with means for selectively delivering fuel to the injection means during boost periods of operation with the injected fuel being ignited by contact with the outer surface of the wall of the sustaining chamber, a flight sustaining nozzle connected to receive a flow of burning gases from the sustaining chamber and having an outwardly diverging nozzle surface, and an outer boost nozzle connected to receive a flow of burning gases from the boost chamber and having an outwardly diverging nozzle surface axially spaced outwardly from the end of the sustaining nozzle so that the boost gases can flow through the annular space at the end of the sustaining nozzle and into the throat of the boost nozzle, the diverging nozzle surface of the boost nozzle positioned to form a substantially parallel extension of the diverging nozzle surface of the sustaining nozzle and spaced axially therefrom sufficiently to accommodate a flow of gases from the boost chamber so that both of the nozzles will coact to form reaction surfaces for gases emitted from the sustaining chamber when the sustaining chamber alone is supporting combustion so that there is no base drag from the boost nozzle during the sustaining portion of flight and a relatively high nozzle area ratio will be provided for high altitude sustaining flight and so that boost gases passing through the boost nozzle will have a relatively low area ratio for low altitude flight.

3. A propulsion mechanism for jet propelled aircraft or the like wherein sustaining and boost levels of thrust are obtained for high altitude and low altitude flight comprising a thrust sustaining gas generating chamber, means for continuously delivering sustaining fuel to said sustaining chamber, a converging diverging flight sustaining nozzle connected to said sustaining chamber, a boost gas generating chamber, means for delivering boost fuel to said boost chamber during boost periods of flight, and a converging diverging boost nozzle connected to the boost chamber and positioned coaxial with the sustaining nozzle and with its throat spaced downstream from the end thereof forming an annular boost gas flow space at the end of the sustaining nozzle leading to the boost nozzle, the inner diverging surface of said boost nozzle sufficiently spaced axially from the sustaining nozzle to accommodate a flow of gas and forming a substantially parallel continuation of the inner diverging surface of the sustaining nozzle with substantially the same rate of expansion so that both nozzles will act as a single nozzle during sustaining flight and there is no base drag from an inoperative boost nozzle during the sustaining portion of flight with a high nozzle area ratio for high altitude sustaining flight and so that the boost nozzle alone will have a relatively low nozzle area ratio for boost gases for low altitude flight.

References Cited in the file of this patent

UNITED STATES PATENTS

| | | |
|---|---|---|
| 1,389,797 | Thompson | Sept. 6, 1921 |
| 2,605,608 | Barclay | Aug. 5, 1952 |
| 2,706,887 | Grow | Apr. 26, 1955 |

FOREIGN PATENTS

| | | |
|---|---|---|
| 715,391 | Great Britain | Sept. 15, 1954 |
| 754,141 | Great Britain | Aug. 1, 1956 |